United States Patent

[11] 3,628,694

[72] Inventor Matthew Nichols
  Norristown, Pa.
[21] Appl. No. 26,616
[22] Filed Apr. 8, 1970
[45] Patented Dec. 21, 1971
[73] Assignee Sauter Packaging Company
  Souderton, Pa.

[54] APPARATUS FOR PACKAGING MEDICINAL TABLETS OR THE LIKE
6 Claims, 9 Drawing Figs.
[52] U.S. Cl. .................................................. 221/265, 53/246
[51] Int. Cl. .................................................. B65b 35/08, B65b 35/30
[50] Field of Search ................................... 53/35, 166, 247, 244–246; 221/265

[56] References Cited
UNITED STATES PATENTS
2,515,594 7/1950 Fischman ...................... 221/265 X
3,281,012 10/1966 Martell .......................... 53/247 X
3,545,164 12/1970 Middleton ..................... 53/247 X
2,339,115 1/1944 Scherer ......................... 53/35
2,801,025 7/1957 Cookson et al. ............... 221/265 X Primary Examiner—Theron E. Condon
Assistant Examiner—Neil Abrams
Attorney—Necho and Kimmelman ABSTRACT: An apparatus including a mechanism for making tablet receiving blisters in a continuous strip of thermoplastic material, a mechanism for continually delivering tablets one to each blister, a mechanism for applying continuous sealing strip to the thermoplastic strip to seal the said tablets within the blisters, a mechanism for perforating or scoring the laminated strip to permit easy severance of the strip into segments comprising one or more blisters, the apparatus being characterized by the provision of an easily mounted and dismounted adapter plate whereby tablets of different sizes may be packaged in the same strip by merely changing the indexing plate and without dismantling or modifying any of the other mechanisms comprising the apparatus.

INVENTOR.
MATTHEW NICHOLS
BY
Nacho and Kimmelman
ATTORNEY.

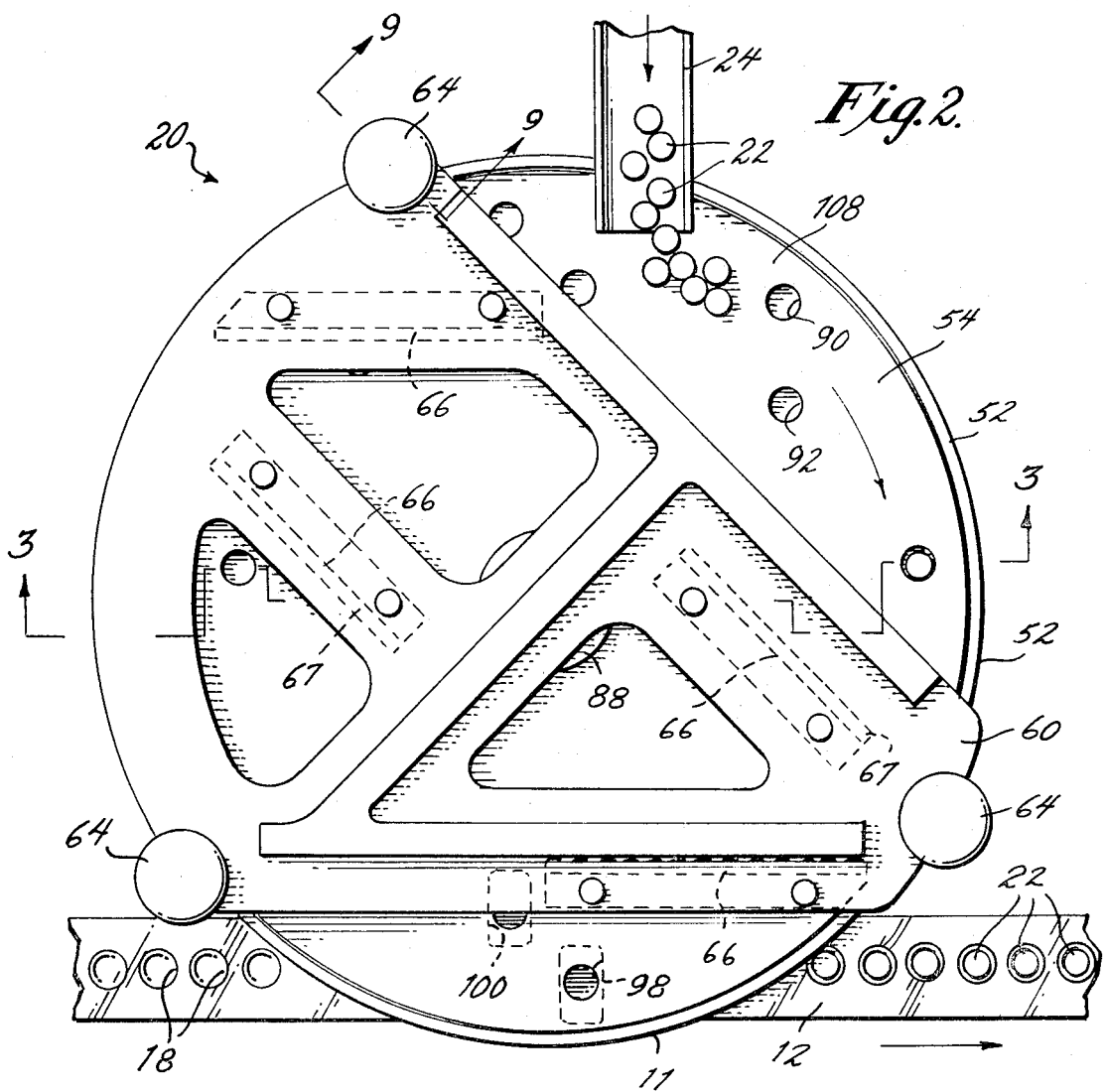
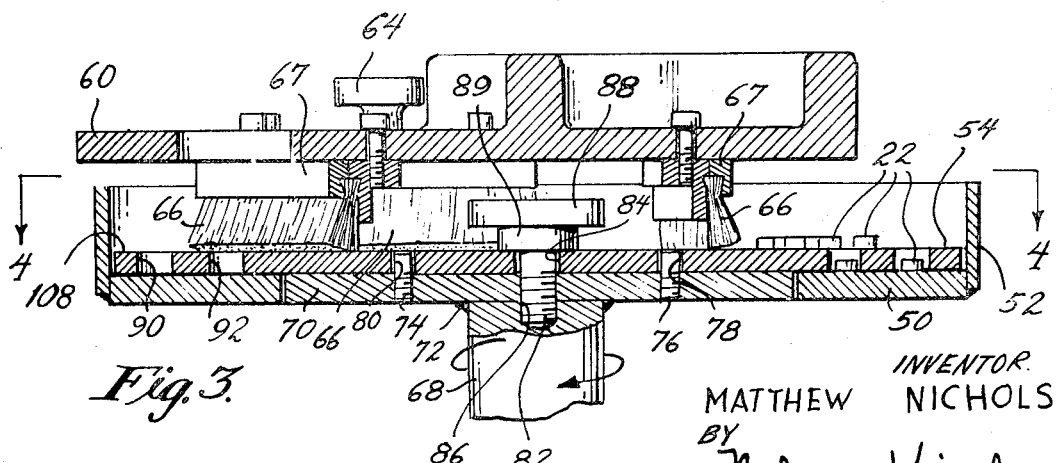

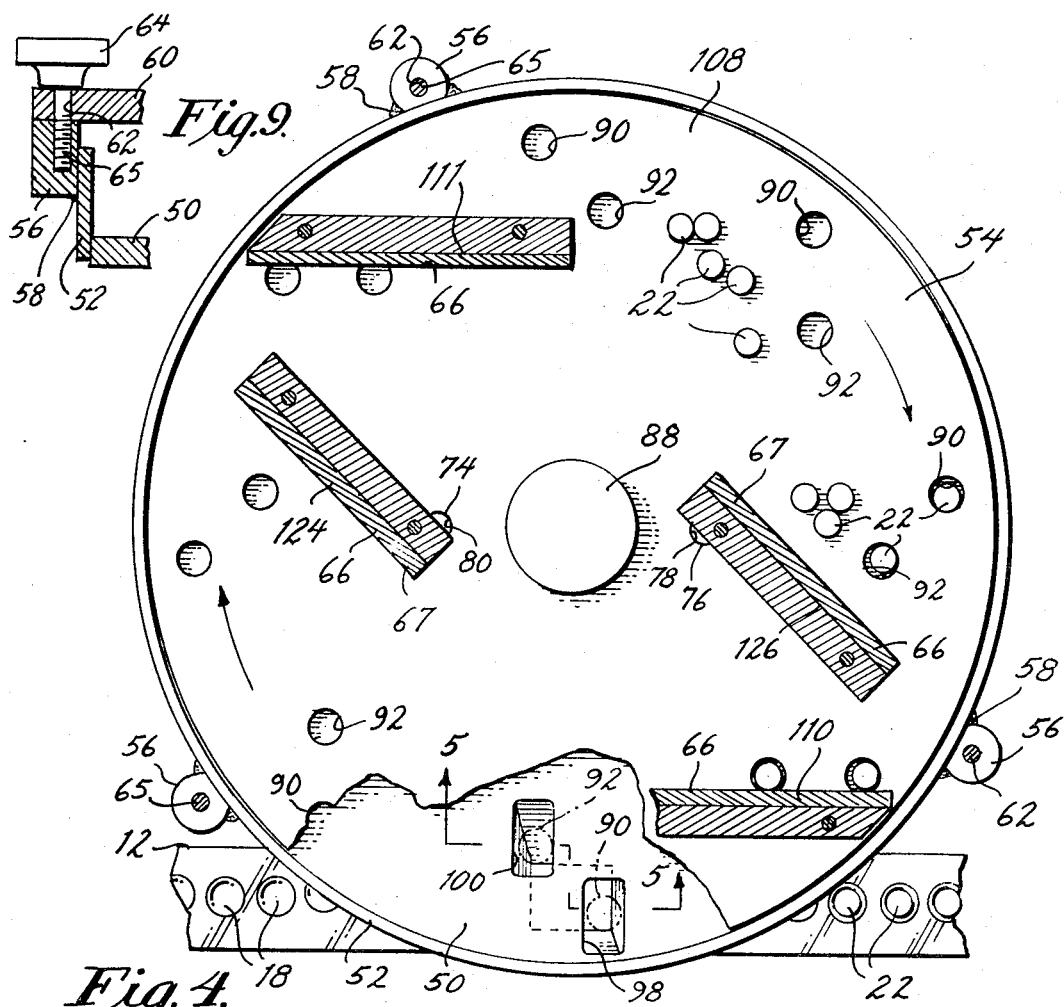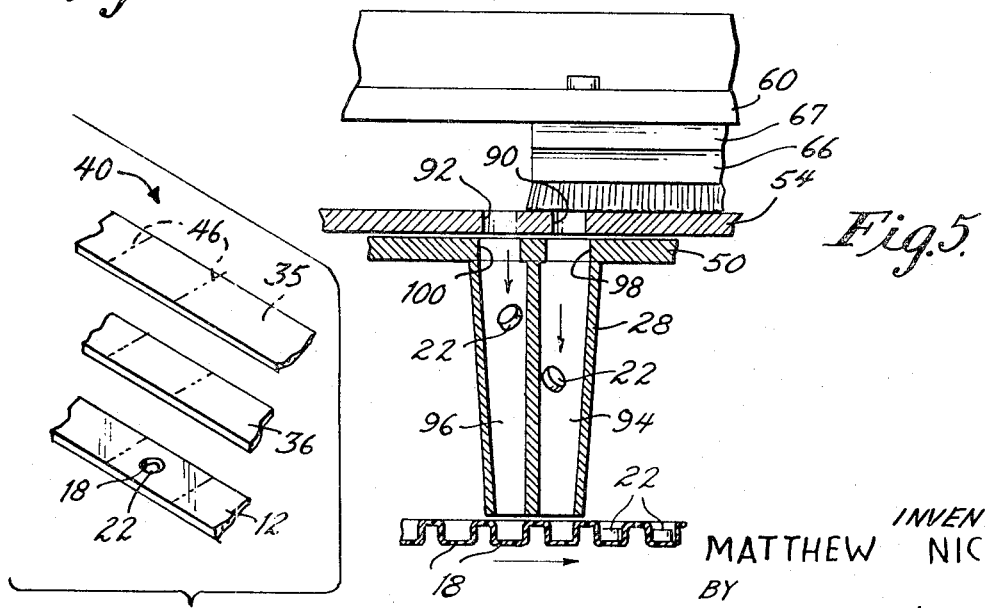

APPARATUS FOR PACKAGING MEDICINAL TABLETS OR THE LIKE

BACKGROUND OF THE INVENTION

The present invention relates to the general field of medicinal packaging and more particularly, is directed to a device capable of individually packing and labeling medicinal tablets or the like in continuous strips.

In the interest of sanitation, speed, accuracy and inventory control, it has been increasingly the practice in institutions such as hospital and nursing homes to seal medicinal tablets in spaced blisters formed in a continuous strip of thermoplastic material which is perforated transversely between blisters. Additionally, the strip is usually imprinted with indicia to indicate and identify the sealed tablets. By this arrangement, if a patient is to get, say three tablets of a given medication per day, the hospital or nursing home dispensary pharmacist simply severs the desired number of tablet containing blisters and hands them to the nurse. This insures against unsanitary handling of the tablets, it enables the dispensary to control the inventory and permits visual inspection of the data associated with the tablets to insure against dispensing the wrong medication.

If all tablets were of the same size and shape, the system briefly described above would present no problem. But it is the usual practice to formulate medications in tablet or capsule form of many different sizes and this has heretofore made it necessary to change the size of the blister according to the size of the tablet to be sealed within the blister. Since changing of the die and other parts which cooperate in forming the blisters involve a great deal of expense, both in material costs and in the labor costs necessary to adapt the equipment for another size tablet, the costs of prior art devices has been disproportionate to the results obtained.

SUMMARY OF THE INVENTION

The present invention relates generally to an apparatus for individually packaging medicinal tablets of various sizes and more particularly, includes interchangeable indexing plates corresponding to the various sized tablets.

The instant device includes a mechanism for blister forming individual tablet containing recesses in a continuous thermoplastic strip, a mechanism to individually load tablets one at a time to each previously formed blister, a mechanism to seal the top of the tablet filled blister recesses, means to imprint the top sealing strip with tablet identifying indicia and means to transversely perforate the strip intermediate each blister to thereby aid in dispensing any desired number of tablets.

The tablet-loading unit includes a rotary plate and an easily replaceable indexing plate positioned above the rotary plate and provided with readily removable means whereby indexing plates designed to accommodate various sized medicinal tablets may be quickly and easily interchanged as required by the dimensions of the tablet to be loaded. By employing a plurality of interchangeable indexing plates, the entire apparatus may readily be adaptable to individually load pills, tablets and capsules of various sizes without requiring any alteration or modification whatsoever in the remaining portions of the apparatus.

The individual indexing plates employed with the present invention are inexpensive in manufacture and extremely simple and quick in installation to thereby reduce apparatus and handling costs to a minimum when changing from one medicinal tablet size to another.

It is therefore an object of the present invention to provide an improved apparatus for packaging medicinal tablets of the type set forth.

It is another object of the present invention to provide an apparatus for packaging medicinal tablets employing means to quickly and inexpensively adapt the mechanism to accommodate tablets of varying sizes.

It is another object of the present invention to provide an apparatus for packaging medicinal tablets which employs easily mounted and dismounted adapter plates to accommodate and individually package tablets of different sizes without dismantling or modifying any of the other machine apparatus.

It is another object of the present invention to provide an improved apparatus for packaging medicinal tablets including means to assure loading only one tablet at a time into uniformly sized recesses which had been previously impressed into lengths of thermoplastic strips.

It is another object of the present invention to provide an apparatus for packaging medicinal tablets including angularly positioned brush means which are employed to assure complete distribution of tablets into recesses provided in the indexing plate.

It is another object of the present invention to provide an apparatus for packaging medicinal tablets that is simple in construction, readily interchangeable for use with different sized tablets and trouble free in operation.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 2 is an enlarged cross-sectional view taken along line 2—2 of FIG. 1, looking in the direction of the arrows.

FIG. 3 is a cross-sectional view taken along line 3—3 of FIG. 2, looking in the direction of the arrows.

FIG. 4 is a cross-sectional view taken along line 4—4 of FIG. 3, looking in the direction of the arrows.

FIG. 5 is a partial cross-sectional view taken along line 5—5 of FIG. 4, looking in the direction of the arrows.

FIG. 8 is a partial, exploded perspective view of the tablet containing strip.

FIG. 9 is a partial cross-sectional view taken along line 9—9 of FIg. 2, looking in the direction of the arrows.

DESCRIPTION OF THE PREFERRED EMBODIMENT OF THE INVENTION

Figure 1:
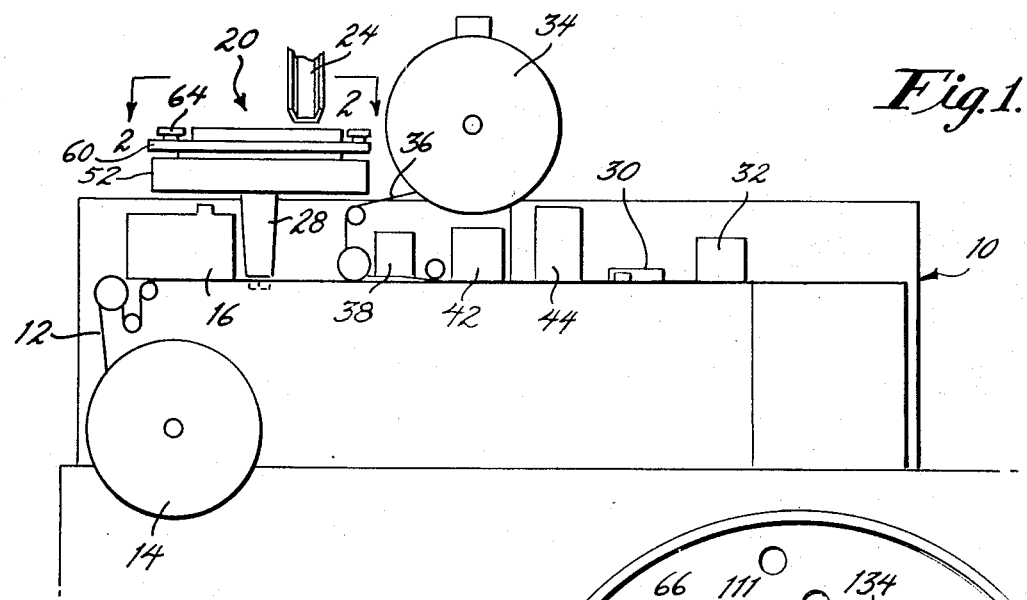
FIG. 1 is a diagrammatical representation of the arrangement of the apparatus associated with the present invention.

Although specific terms are used in the following description for the sake of clarity, these terms are intended to refer only to the particular structure of my invention selected for illustration in the drawings and are intended to define or limit the scope of the invention.

Referring now to the drawings, I show in FIG. 1 an apparatus for packaging medicinal tablets generally designated 10 wherein a strip of thermoplastic tape 12 feeds from the plastic roll 14 through the usual rollers to a blister forming apparatus 16 wherein portions of the tape 12 are deformed in well-known manner to provide a plurality of depressions or blisters 18 to receive medicinal preparations in tablet or capsule form as hereinafter more fully set forth. The pill-loading unit 20 receives tablets 22 from the chute 24 and deposits them upon the indexing plate 54 which rotates to deliver the pills individually to the loading chute 28 for loading one at a time in each previously formed blister 18. The index and feed mechanism 30 pulls the tape 12 across the apparatus 10 in well-known manner and delivers the tablet filled and sealed tape to the cutoff station 32 wherein the loaded and sealed strip may be cut to any predetermined desired size containing a known quantity of tablets in individual, sealed, spaced relationship.

A roll 34 feeds a strip of foil 36 which may be previously paper backed or which may have an associated strip of paper 35 to the printing station 38 wherein indicia is imprinted in the usual manner upon the exposed surface of the foil 36 or paper backing 35 (if used) to indicate the exact name of the tablets being individually loaded into the tape depression 18. Additionally, the station 38 continuously seals the foil 36 to the thermoplastic strip 12 to form a tablet sealing laminate 40 comprised of the recessed, thermoplastic strip 12, the foil strip 36 and the paper indicia imprinted paper backing strip 35 (if used). Each section of the strip laminate 40 is imprinted for ready identification of the tablet contents. It will be appreciated that the indicia imprinted at the printing station 38 may be readily changed to correspond with any type of tablet being packaged in accordance with well-known techniques.

The indexing and feed section 30 pulls the laminate 40 of the thermoplastic tape 13, the foil 36 (and paper 35) through the sealing station 42 wherein the foil 36 is tightly sealed to the thermoplastic tape 12 in well-known manner to prevent the entrance of dirt or other contaminates and to maintain completely sanitary tablet storage facilities. The sealing station 42 functions in well-known manner to seal the tablets 22 within the previously formed blisters 18 without smearing or otherwise defacing the indicia imprinted upon the foil (or paper) surface at the printing station 38. The imprinted, sealed, tablet containing strip laminate 40 then feeds through the perforating station 44 wherein transverse perforations 46 are impressed across the laminate intermediate each tablet containing blister 18 to facilitate tearing the strip into any desired length. The cutoff station 32 operates in conjunction with the indexing and feed station 30 and cuts off the laminate 40 to provide a predetermined length of laminate containing a plurality of individually packaged tablets 22 of any desired predetermined quantity.

Referring now to FIGS. 2–6, the pill loading unit is illustrated in detail. A stationary ring 50 carries a peripheral upwardly extending flange 52 and positions in a horizontal plane to support the indexing plate 54 which has rotary motion thereupon. As best seen in FIG. 4, the flange 52 supports a plurality of peripherally spaced bosses 56 which may be exteriorly welded thereto as at 58 to carry the brush supporting plate 60 in stationary relationship. Each boss 56 is drilled and tapped to provide a threaded recess 62 to threadedly receive the plate supporting threaded knob 64 to facilitate rapid and easy connection and disconnection of the brush supporting plate 60 with relation to the stationary flange 52. The plate 60 carries a plurality of randomly positioned, horizontal, depending brushes 66 which angularly contact and sweep the surface of the indexing plate 54 as hereinafter more fully set forth.

A rotary shaft 68 receives power from a motor (not shown) and rotates a horizontal plate 70 in planar alignment within the stationary ring 50. The shaft 68 concentrically secures to the bottom of the plate 70 in well-known manner such as by continuous fillet welds 72 to adequately support the plate in dynamic balance in all rotative positions. A pair of threaded pins 74, 76 threadedly secure within threaded openings provided in the horizontal rotary plate 70 and upwardly project to readily receive and quickly position the indexing plate 54 in concentrically aligned, rotary position upon the stationary ring 50. Each indexing plate 54 is provided with a pair of spaced, diametrically opposed openings 78, 80 in alignment with the pins 74, 76 with each opening 78, 80 being of slightly greater diameter than the diameter of its associated pin 74, 76. When it is desired to position an indexing plate 54 upon the stationary ring 50 for pill-loading purposes, the plate openings 78, 80 simply register over the horizontal plate supported pins 74, 76 and insert thereover. In this manner, the rotary motion of the shaft supported horizontal plate 70 readily transmits rotary power to the indexing plate 54 through the interaction of the respective pins 74, 76 upon the periphery of the plate openings 78, 80.

A threaded screw 82 inserts through the index plate central opening 84 and turns into the threaded socket 86 provided in the horizontal plate 70 and the rotary shaft 68 for index plate securing purposes. A large hand knob 88 upwardly secures to the threaded screw 82 through a pressure ring 89 to facilitate rapid securing and removal of the index plate 54 with respect to the rotary horizontal plate 70. The interaction of the knob affixed pressure ring 89, the threaded pins 74, 76 and the plate openings 78, 80 all cooperate to removably affix the index plate 54 to the horizontal plate 70 to assure positive rotation of the index plate 54 simultaneously with the rotation of the rotary horizontal plate 70.

Each indexing plate 54 is provided with a plurality of spaced pairs of tablet receiving openings 90, 92 positioned to overlie the stationary ring 50 and arranged in concentric circles to receive medicinal tablets 22 to carry the tablets 22 to a position in vertical registry with the depending, adjacent chutes 94, 96. A chute 24 connects to a tablet hopper (not shown) and feeds a plurality of tablets 22 by gravity upon the top surface 108 of the indexing plate 54. Rotation of the plate 54 by the rotating shaft 68 through the horizontal plate positioned pins 74, 76 continuously exposes portions of the top surface of the indexing plate 54 to receive additional tablets 22 as they feed down the chute 24.

As best seen in FIG. 4, the stationary ring 50 is provided with a pair of pill receiving openings 98, 100 in registry with the chutes 94, 96 to periodically receive tablets from the indexing plate 54 as the plate rotates the tablet receiving openings 90, 92. Each opening 98, 100 is punched or otherwise machined of size large enough to accommodate the largest tablets or capsules contemplated to be handled by the apparatus. In this manner, the openings 98, 100 and the connected depending chutes 94, 96 may be utilized with all sizes and configuration of tablets or capsules without requiring any change whatsoever. A standard thermoplastic tape and standard sized blister 18 are employed in all instances. Thus, the machine may be universally adapted for use with all forms and dimensions of tablets with no changes whatsoever required in the basic structure of the rotary shaft 68, the horizontal plate 70, the fixed ring 50, the flange 52 and the depending chutes 94, 96.

Figure 7:
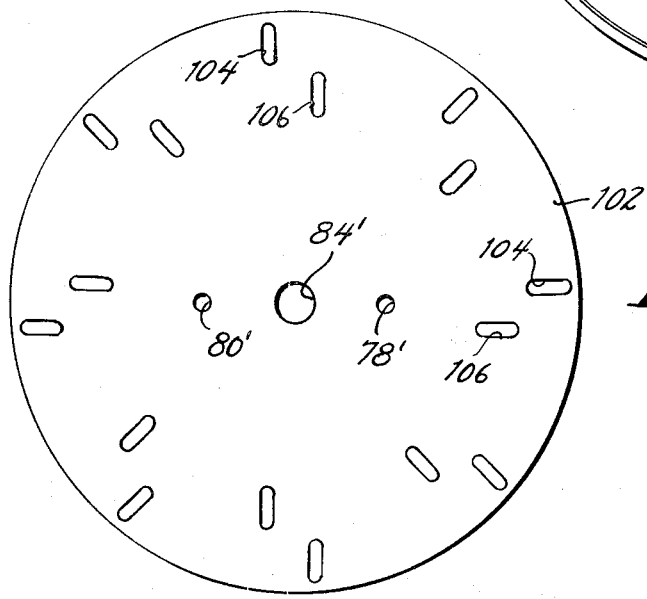
FIG. 7 shows a modified design of an indexing plate.

In order to accommodate tablets or capsules of various sizes and configuration utilizing all of the basic equipment of the apparatus, various index plates 54 may be employed having tablet receiving openings 90, 92 of size to accommodate various sized tablets. Thus, when capsules of elongated configuration are to be packaged, an index plate 102 of suitable diameter similar to the index plate 54 to rotate within the upturned flange 52 may be employed and is fabricated with a plurality of diametrically opposed, circularly spaced elongated openings 104, 106 therethrough. See FIG. 7. A central opening 84' and pin receiving openings 78', 80' are provided and are similarly utilized to permit rapid, complete interchangeability of the various indexing plates 102, 54.

As best illustrated in FIGS. 3 and 4, it is seen that the tablet receiving openings 90, 92 drill completely through the index plate 54 to form a plurality of pairs of diametrically opposed, circularly spaced tablet receiving openings which in cooperation with the fixed ring 50 beneath, form a plurality of rotating tablet receiving recesses. Each tablet receiving opening 90, 92 rotatively respectively vertically aligns with the fixed chute openings 98, 100 momentarily as the index plate 54 is rotated in response to operation of the rotary shaft 68. Thus, the tablets 22 which enter the plurality of openings 90, 92 momentarily rotatively align with the stationary ring openings 98, 100 in turn as the indexing plate 54 revolves upon the stationary ring 50. The tablets 22 which are thus brought into registry with the chute openings 98, 100 fall individually by gravity through the chutes 94, 96 to singly enter adjacent blisters 18 which register with the bottom of the chutes 94, 96 through action of the indexing and feed station 30. See FIG. 5.

Figure 6:
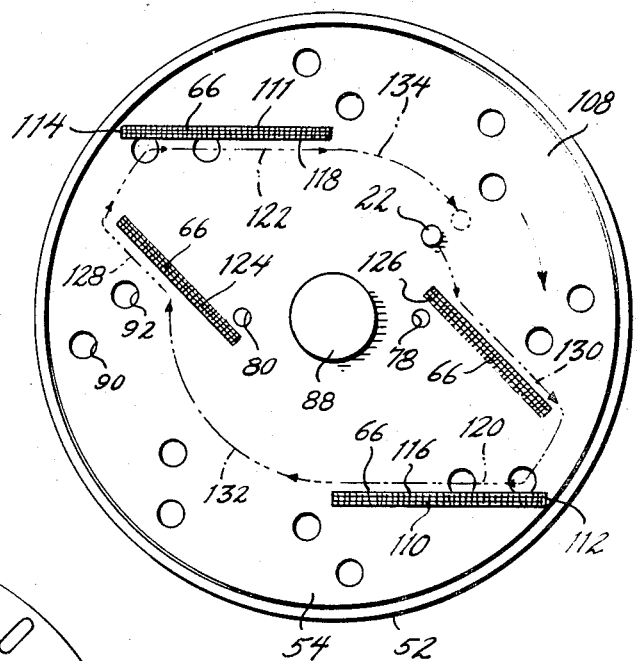
FIG. 6 is a diagrammatical representation showing the path of pills upon an indexing plate.

The brush supporting plate 60 carries a plurality of depending brushes generally designated 66 through brush connectors 67 and positions in a plane above the indexing plate 54 in spaced relationship therefrom with the brushes 66 contacting the top 108 of the index plate 54. The tablets 22 introduced upon the top surface 108 of the index plate 54 by the chute 24 contact the brushes 66 as the brushes sweep the top surface upon rotation of the index plate 54 in the direction of the arrows as indicated in FIGS. 2, 4 and 6. The brush supporting plate 60 removably affixes over the index plate 54 in horizontal spaced relationship through action of the plurality of threaded knobs 64 and affixed screws 65 which turn into threaded recesses 62. The recesses 62 drill and tap into the bosses 56 which are welded or otherwise secured about the periphery of the stationary flange 52 to render the brush supporting plate 60 readily removable simply by turning the plurality of plate supporting knobs 64 to disengage the knob affixed screws 65 from the associated threaded recesses 62. In this manner, any index plate 54 designed with openings 90, 92 to accommodate a tablet 22 of any given size may be readily applied to the pill-loading unit 20 by first removing the brush supporting plate 60 and then turning the knob 88 to disengage the threaded screw 82 from its associated threaded socket 86. Upon removal of the index plate 54, a modified index plate, for example plate 102, (FIG. 7) applies within the circular flange 52 and above the stationary ring 50 by aligning the openings 78', 80' over the threaded pins 74, 76. The modified index plate 102 secures in position by utilizing the threaded knob 88 to force the pressure ring 89 onto the top of the index plate 102. The entire apparatus can then quickly be placed back in operation by reinstalling the brush supporting plate 60 through clamping action of the plurality of peripherally placed knobs 64.

Referring now to FIG. 6, a preferred location and arrangement of brushes 66 is illustrated. Each brush 66 positions in angular relationship to each other and to any diametric axis of the index plate 54. The outer brushes 110, 111 position with their respective outermost edges 112, 114 immediately adjacent the peripheral flange 52 to sweep all tablets 22 traveling near the outer periphery of the index plate 54 and to direct the tablets inwardly at an angle of approximately 45° from a diametrical line drawn through the outer edge 112 or 114. As illustrated, it will be noted that the inward path 120, 122 of the tablets 22 along the longitudinal edges 116, 118 of the brushes 110, 111 overlies the circular paths defined by the spaced tablet receiving openings 90, 92 as the index plate 54 rotates upon the stationary ring 50. It will also be noted that the openings 90, 92 position to define a straight line relationship parallel to the longitudinal brush edges 116, 118 when the openings 90, 92 rotate beneath the outer brushes 110, 111. Thus, as indicated in FIG. 6, the tablets 22 which are introduced upon the top surface 108 of the index plate 54 follow the path 120, 122 illustrated in broken lines along the respective longitudinal edges 116, 118 of the brushes 110, 111 by the interaction of the rotary motion of the index plate 54 and the sweeping motion of the brushes. The tablets 22 sweep into the plurality of rotating openings 90, 92 by the action of the brushes 110, 111 which position to sweep the outer periphery of the rotating index plate 54.

The intermediate brushes 124, 126 receive all tablets 22 not swept into the openings 90, 92 by the outer brushes 110, 111 along the circular paths 132, 134 and angularly direct all loose tablets 22 toward the outer periphery of the index plate under impetus of the rotary motion of the index plate for engagement upon the outermost brushes 110, 111. As illustrated, the intermediate brushes 124, 126 angularly position most advantageously to direct the loose tablets 22 toward the outer periphery of the index plate 54. The tablet receiving openings 90, 92 or 104, 106 (FIG. 7) are sized to receive only a single tablet or capsule therein. In this manner, as the index plate 54 rotates in the direction of the arrows, tablets 22 are urged into the rotating recesses formed by the openings 92, 94 (or 104, 106) and the stationary ring 50 along the longitudinal edges 116, 118 of the brushes 110, 111 as the openings pass therebeneath. The tablets 22 which deposit as the recesses pass beneath the brushes 110, 111, rotatively travel over the fixed plate 50 until the openings 90, 92 register with the chute openings 98, 100 whereupon the tablets fall by gravity through the chutes 94, 96 to individually load the spaced blisters 18. See FIG. 5. The nonrecessed tablets continue to rotate upon the top surface 108 of the index plate 54 and are swept along the paths 120, 132, 128, 122, 134, 130 by the brushes until they are eventually deposited into an opening 90 or 92. The intermediate brushes 124, 126 extend angularly outwardly a sufficient distance to overlie the innermost circle of spaced tablet receiving openings 92 and additionally serve to urge the tablets 22 into these openings along the respective tablet paths 128, 130. The combination of the outer brushes 110, 111 and the intermediate brushes 124, 126 cooperate to fill all tablet receiving openings 90, 92 at all times during revolution of the index plate to assure that each pair of index plate openings 90, 92 contains a tablet 22 as the openings rotate into registry with the stationary ring openings 98, 100. In this manner, each blister 18 that has previously formed in the thermoplastic strip 12 will assuredly be individually filled during its indexed travel beneath the chutes 94, 96. Indexing means (not shown) serve to coordinate the rotative movement of the index plate 54 and the longitudinal movement of the thermoplastic strip in well-known manner to pull empty blisters into alignment with the chutes 94, 96 when each pair of index plate openings 90, 92 registers with the fixed chute openings 98, 100 to thereby individually fill each blister 18 with a single tablet 22.

I claim:

1. In an apparatus for individually packaging medicinal tablets, the combination of:
   A. fixed tablet feeding means including at least one tablet receiving opening,
   said tablet receiving opening being of sufficient size to pass the largest tablet to be packaged by the apparatus;
   B. interchangeable index plate means rotatable above the fixed tablet feeding means,
   said interchangeable index plate means comprising a plurality of individual index plates provided respectively with tablet receiving openings of varying sizes,
   i. said index plates individually positioning above the fixed tablet feeding means for rotation with respect thereto,
   ii. each said index plate having tablet receiving openings of a size different from another index plate to accommodate medicinal tablets of predetermined different size by changing index plates;
   the said tablet receiving openings of the index plates rotatively registering with the tablet receiving opening provided in the fixed tablet feeding means;
   C. rotative means operable through the fixed tablet feeding means,
   said rotatable means including easily engageable index plate driving means; and
   D. stationary brush means sweeping the medicinal tablets over the surface of the index plate means,
   a first portion of said brush means being positioned to sweep all tablets located near the outer periphery of an index plate centrally towards tablet receiving openings in said index plate,
   a second portion of said brush means being positioned to sweep tablets which were not seated in tablet-receiving openings by contact with the first portion of said brush means back towards the outer periphery of an index plate, whereby all said medicinal tablets will be urged into a position to register over and fall into an index plate tablet receiving opening.

2. The invention of claim 1 wherein each index plate is provided with driving pin openings and wherein the index plate driving means include upwardly projecting pins which fit easily within the said driving pin openings to rotate an index plate above the fixed tablet feeding means.

3. The invention of claim 2 and a pressure ring threadedly urged into contact with the index plate to facilitate rapid securing and removal of the index plate with respect to its association with the fixed tablet feeding means.

4. The invention of claim 1 wherein the brush means easily removably connect to the fixed tablet feeding means above the index plate means, said brush means easily separating from the fixed tablet feeding means when interchanging the said index plates.

5. The invention of claim 1 wherein the brush means are disposed in angular relationship to the diameter of the index plate.

6. The invention of claim 5 wherein pairs of index plate tablet receiving openings rotatively register in alignment beneath the said first portion of brush means as the index plate means rotate above the fixed tablet feeding means.

* * * * *